US008593177B2

(12) United States Patent (10) Patent No.: US 8,593,177 B2
Iyer et al. (45) Date of Patent: Nov. 26, 2013

(54) INTEGRATED CIRCUIT WITH TIMING AWARE CLOCK-TREE AND METHOD FOR DESIGNING SUCH AN INTEGRATED CIRCUIT

(75) Inventors: Arun Sundaresan Iyer, Karnataka (IN); Nithin Shetty Kidiyoor, Karnataka (IN); Shyam Sundaramoorthy, Karnataka (IN); Ravishankar Karthikeyan, Karnataka (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/423,333

(22) Filed: Mar. 19, 2012

(65) Prior Publication Data

US 2013/0241597 A1 Sep. 19, 2013

(51) Int. Cl.
*H03K 19/00* (2006.01)
*G06F 9/455* (2006.01)
*G06F 17/50* (2006.01)

(52) U.S. Cl.
USPC .............. 326/93; 716/108; 716/113; 716/116

(58) Field of Classification Search
USPC ................... 326/93, 95; 716/108, 113, 116
See application file for complete search history.

(56) References Cited

U.S. PATENT DOCUMENTS

| 5,790,841 A | 8/1998 | Scherer et al. |
| 6,421,818 B1 * | 7/2002 | Dupenloup et al. .......... 716/105 |
| 6,442,739 B1 * | 8/2002 | Palermo et al. .............. 716/108 |
| 6,769,104 B2 * | 7/2004 | Rodgers et al. .............. 327/295 |
| 7,039,891 B2 * | 5/2006 | Tetelbaum .................... 716/113 |
| 7,475,374 B1 * | 1/2009 | Johnson et al. .............. 716/119 |
| 7,739,641 B1 * | 6/2010 | Barnes .......................... 716/113 |
| 2005/0010884 A1 * | 1/2005 | Lu et al. ........................... 716/6 |
| 2012/0159416 A1 * | 6/2012 | Jiang et al. .................... 716/113 |

* cited by examiner

*Primary Examiner* — Shawki Ismail
*Assistant Examiner* — Dylan White
(74) *Attorney, Agent, or Firm* — Polansky & Associates, P.L.L.C.; Paul J. Polansky

(57) ABSTRACT

An integrated circuit includes a clock-tree with a plurality of clock buffers, a plurality of clocked storage elements, and a plurality of logic circuits. Each clocked storage element has a clock input terminal connected to one of the plurality of clock buffers and a weight. Each of the logic circuits is associated with two of the plurality of clocked storage elements and is characterized as having a logic depth. The weight of each clocked storage element is equal to a sum of an inverse of a logic depth of each of the plurality of logic circuits associated therewith. A first clocked storage element which has a highest weight and is adjacent to and interacts with a second clocked storage element via one of the plurality of logic circuits. A first clock buffer provides a common clock signal to the first and second clocked storage elements.

18 Claims, 6 Drawing Sheets

INTEGRATED CIRCUIT WITH TIMING AWARE CLOCK-TREE AND METHOD FOR DESIGNING SUCH AN INTEGRATED CIRCUIT

FIELD

This disclosure relates generally to a clocked integrated circuit, and more particularly to a clocked integrated circuit with a multi-leveled clock-tree.

BACKGROUND

Currently state-of the-art integrated circuits (ICs), such as microprocessors, are designed with hundreds of millions of transistors. A microprocessor's performance is largely determined by the input clock speed. Internal clock signals generated from the input clock coordinate data transfers between circuit components. However, microprocessor designers continue to increase clock frequencies which reduce timing budgets to meet internal setup and hold times.

Typically, during design of an IC a clock-tree is generated and used to distribute a clock signal from a common source to various circuit components. A typical design flow proceeds from design synthesis to place and route and then to clock-tree synthesis (CTS). However, CTS is unaware of the logic-interaction and timing requirements between various circuit elements, and there is a possibility of high clock divergence between interacting circuit elements, which may heavily impact performance and cause race (hold) conditions during circuit operation.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of an IC with clustered clocked storage elements and method for designing such an IC are described below. In some embodiments, clocked storage elements of an IC are grouped together in several clusters based on a level of relative interaction with each other. The clocked storage elements within a cluster are placed physically close to each other on the IC to reduce clock divergence and improve overall IC performance. In one particular embodiment, the clocked storage elements are clustered together based on a weight which is equal to the inverse of the logic depth between a given clocked storage element and all other clocked storage elements that interact with it.

Figure 1:
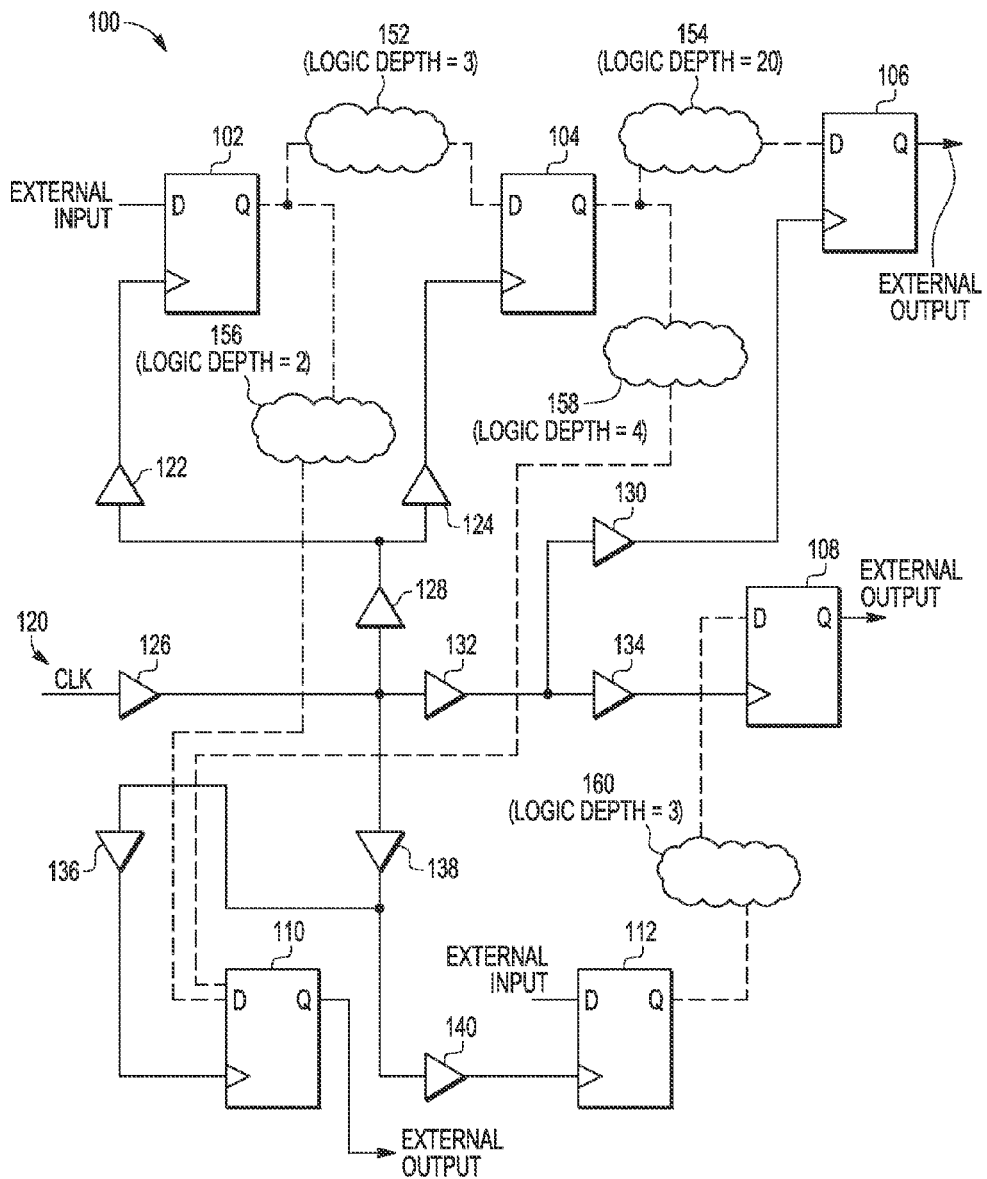
FIG. 1 illustrates in block diagram form a portion of an integrated circuit with clocked storage elements.

FIG. 1 illustrates in block diagram form a portion 100 of an IC with clocked storage elements 102, 104, 106, 108, 110, and 112. Portion 100 includes clocked storage elements 102, 104, 106, 108, 110, and 112, a clock-tree 120 which includes clock buffers 122, 124, 126, 128, 130, 132, 134, 136, 138, and 140, and logic circuits 152, 154, 156, 158, and 160.

Clock-tree 120 receives a clock signal labeled "CLK" which oscillates between a high and a low state in the form of a square wave with a fixed constant frequency and is utilized to latch inputs of the clocked storage elements 102, 104, 106, 108, 110, and 112.

Each of clock buffers 122, 124, 126, 128, 130, 132, 134, 136, 138, and 140 has a clock input terminal and a clock output terminal for providing a clock signal. In the illustrated embodiment, clock buffer 122 has a clock input terminal connected to the clock output terminal of clock buffer 128 and a clock output terminal connected to the clock input terminal of clocked storage element 102. Clock buffer 124 has a clock input terminal connected to the clock output terminal of clock buffer 128 and a clock output terminal connected to the clock input terminal of clocked storage element 104. Clock buffer 126 has a clock input terminal for receiving the master clock signal and a clock output terminal connected to the clock input terminal of clock buffers 128, 132, and 138. Clock buffer 128 has a clock input terminal connected to the clock output terminal of clock buffer 126 and a clock output terminal connected to the clock input terminal of clocked storage element 104. Clock buffer 130 has a clock input terminal connected to the clock output terminal of clock buffer 132 and a clock output terminal connected to the clock input terminal of clocked storage element 106. Clock buffer 132 has a clock input terminal connected to the clock output terminal of clock buffer 126 and a clock output terminal connected to the clock input terminal of clock buffers 130 and 134. Clock buffer 134 has a clock input terminal connected to the clock output terminal of clock buffer 132 and a clock output terminal connected to the clock input terminal of clocked storage element 108. Clock buffer 136 has a clock input terminal connected to the clock output terminal of clock buffer 138 and a clock output terminal connected to the clock input terminal of clocked storage element 110. Clock buffer 138 has a clock input terminal connected to the clock output terminal of clock buffer 126 and a clock output terminal connected to the clock input terminal of clock buffers 136 and 140. Clock buffer 140 has a clock input terminal connected to the clock output terminal of clock buffer 138 and a clock output terminal connected to the clock input terminal of clocked storage element 112.

Clocked storage elements 102, 104, 106, 108, 110, and 112 are circuits that are used to store state information. In the illustrated embodiment, clocked storage elements 102, 104, 106, 108, 110, and 112 are delay (D-type) flip-flops but various other types of clocked storage elements may be utilized. For example, each of clocked storage elements 102, 104, 106, 108, 110, and 112 may also be a gated (G-type) delay latch, a set-reset (SR-type) flip-flop, a JK flip-flop, a toggle (T-type) flip-flop, or another known clocked storage element. In the illustrated embodiment, clocked storage element 102 has a clock input terminal connected to the clock output terminal of clock buffer 122, an input terminal (D), and an output terminal (Q) connected to logic circuit 152 and logic circuit 156. Clocked storage element 104 has a clock input terminal connected to the clock output terminal of clock buffer 124, an input terminal (D) connected to logic circuit 152, and an output terminal (Q) connected to logic circuitry 154 and logic circuitry 158. Clocked storage element 106 has a clock input terminal connected to the clock output terminal of clock buffer 130, an input terminal (D) connected to logic circuit 154, and an output terminal (Q). Clocked storage element 108 has a clock input terminal connected to the clock output terminal of clock buffer 134, an input terminal (D) connected to logic circuit 160, and an output terminal (Q). Clocked storage element 110 has a clock input terminal connected to the clock output terminal of clock buffer 136, an input terminal (D) connected to logic circuit 156 and logic circuit 158, and an output terminal (Q). Clocked storage element 112 has a clock input terminal connected to the clock output terminal of clock buffer 140, an input terminal (D), and an output terminal (Q) connected to logic circuitry 160.

Various ones of clocked storage elements 102, 104, 106, 108, 110, and 112 are associated with and interact with each other through one or more levels of combinatorial logic including logic circuits 152, 154, 156, 158, and 160. Note that FIG. 11 shows each clocked storage element as a single D flip-flop to simplify the discussion but in practice these are representative of groups of flip-flops each having a size of, for example, 32. In the illustrated embodiment, clocked storage element 102 interacts with clocked storage element 104 through logic circuit 152, and with clocked storage element 110 through logic circuit 156. Clocked storage element 104 interacts with clocked storage element 106 through logic circuit 154, and with clocked storage element 110 through logic circuit 158. Clocked storage element 108 interacts with clocked storage element 112 through logic circuit 160.

Logic circuits 152, 154, 156, 158, and 160 are illustrated as clouds and represent various numbers of logic levels between clocked storage elements 102, 104, 106, 108, 110, and 112 as described above. Each of logic circuits 152, 154, 156, 158, and 160 has a logic depth. The logic depth is the largest number of logic levels between input and output signals of the interacting clocked storage elements. In the illustrated embodiment, logic circuit 152 has a logic depth of 3. Logic circuit 154 has a logic depth of 20. Logic circuit 156 has a logic depth of 2. Logic circuit 158 has a logic depth of 4. Logic circuit 160 has a logic depth of 3. It should be understood that the logic depth may vary widely, based on IC design.

In operation, clock 126 is an input clock signal to clock buffers 128, 132, and 138. Clock buffers 128, 132, and 138 provide buffered clock signals to clock buffers 122, 124, 130, 134, 136, and 140, which re-buffer the buffered clock signal and provide re-buffered clock signals to clocked storage elements 102, 104, 106, 108, 110, and 112 and logic circuits 152, 154, 156, 158, and 160 perform various functions during individual clock periods. For example, state-of-the-art microprocessors are pipelined, and the clocked storage elements in FIG. 1 latch the results of a corresponding pipeline stages. Conventional CTS used to design portion 100 places clock buffers based on factors such as fan-out and physical placement. Note that in portion 100, clocked storage element 102 interacts with clocked storage element 110 through only two levels of logic in logic circuit. However, the two clocked storage elements 102 and 110 are separated by four levels in clock-tree 120. This variance in association can lead to clock divergence (CD) and potential timing problems due to, for example, race conditions.

Figure 2:
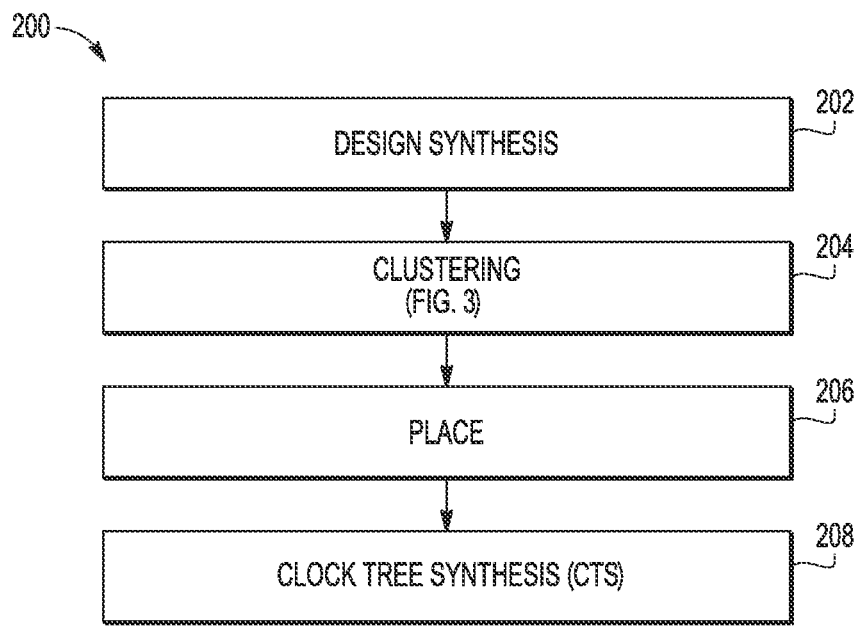
FIG. 2 illustrates a flow chart of a method for designing an integrated circuit according to the present invention.

FIG. 2 illustrates in a flow chart a method 200 for designing an IC according to the present invention. At step 202, a design synthesis tool is used to transform a behavioral model of an IC expressed in, for example, a register transfer level (RTL) file into a netlist that includes logic gates and clocked storage elements. Once design synthesis step 202 is complete, method 200 proceeds to step 204 and the design tool performs the step of clustering the clocked storage elements, as will be described in greater detail below. Generally clustering involves grouping interacting clocked storage elements together, associating them with a common clock buffer in the clock-tree, and placing them physically close to each other on the IC to improve IC performance.

Proceeding to step 206, a place (or place and route) tool first places all electronic components, circuitry, and logic elements in physical proximity on the IC according to the clusters generated during the clustering step 204. The place tool also automatically generates the interconnect patterns needed to connect the placed components. Once all of the components have been placed and interconnections defined, method 200 advances to step 208. At step 208, clock-tree synthesis is performed by a clock-tree synthesis tool resulting in clock buffer placements made according to established criteria such as fan-out.

Figure 3:
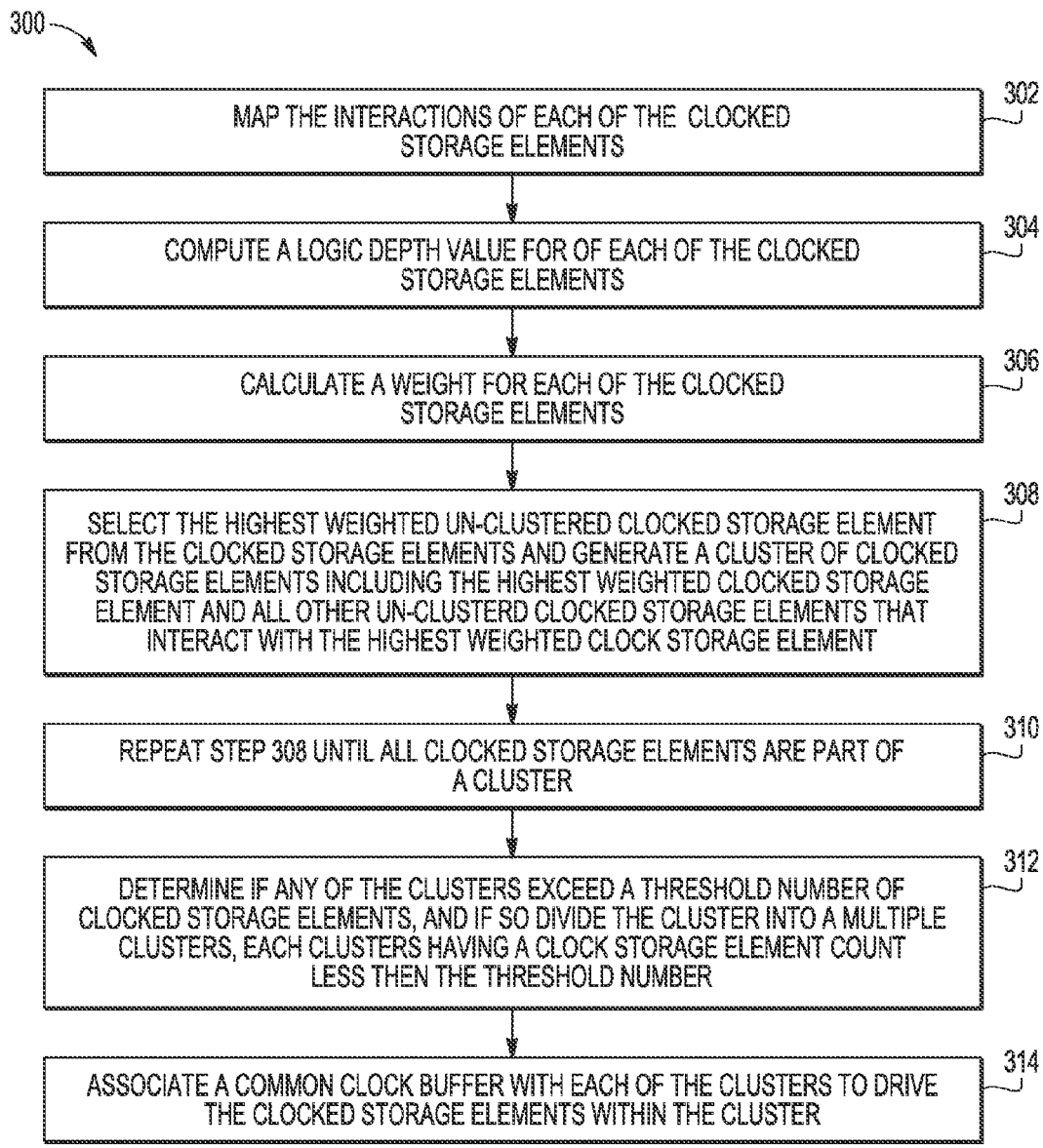
FIG. 3 illustrates a flow chart of a method for implementing the clustering step of FIG. 2.

FIG. 3 illustrates a flow chart of a method 300 for implementing the clustering step of FIG. 2. At steps 302 and 304, the clustering tool maps the interconnections of each of the clocked storage elements and computes a logic depth for each interacting pair of the clocked storage elements. The clustering tool computes the logic depth between an interacting pair of clocked storage elements as the largest number of logic levels between the interacting pair. For example TABLE I shows the logic depth for all interacting pairs of clocked storage elements of FIG. 1.

TABLE I

| First Clocked Storage Element | Second Clocked Storage Element | Logic Depth Value |
| --- | --- | --- |
| 102 | 104 | 3 |
| 102 | 110 | 2 |
| 104 | 110 | 4 |
| 104 | 106 | 20 |
| 108 | 112 | 3 |

Once the logic depth values are determined between each set of interacting clocked storage elements, method 300 advances to step 306 and the clustering tool calculates a weight for each of the clocked storage elements. The weight of each clocked storage element is equal to the sum of one over the logic depth value for each of the clocked storage elements that interact with the clocked storage element to be given a weight. For example the weight of clocked storage element 102 of FIG. 1 is equal to 0.833 (($1/3$)+($1/2$)), that is one over the logic depth value between the pair of clocked storage elements 102 and 104 plus one over the logic depth value between the pair of clocked storage elements 102 and 110. TABLE II shows the weights of each clocked storage elements 102, 104, 106, 108, 110, and 112 of FIG. 1.

TABLE II

| Clocked Storage Element | Weight |
| --- | --- |
| 102 | 0.833 |
| 104 | 0.633 |
| 106 | 0.05 |
| 108 | 0.33 |
| 110 | 0.33 |
| 112 | 0.75 |

Once the clustering tool determines the weight for each clocked storage element, method 300 proceeds to step 308 and the clustering tool selects the highest weighted un-clustered clocked storage element from the clocked storage elements. The clustering tool then generates a cluster of clocked storage elements including the highest weighted clocked storage element and all other un-clustered clocked storage elements interacting with the highest weighted clocked storage element. For example, using the weight table above clocked storage element 102 is selected because it has the highest weight (0.833). Clocked storage element 102 is then clustered with clocked storage elements 104 and 110 because both clocked storage elements 104 and 110 interact with clocked storage element 102 and are un-clustered. TABLE III shows the weights of the remaining un-clustered clocked storage elements after the first cluster is generated.

TABLE III

| Clocked Storage Element | Weight |
| --- | --- |
| 106 | 0.05 |
| 108 | 0.33 |
| 112 | 0.75 |

At step 310, method 300 repeats step 308 until the weight table is empty and all clocked storage elements are part of a cluster. Proceeding with the example above, the clustering tool selects clocked storage element 112, because clocked storage element 112 has the next highest weight of the clocked storage elements that are still un-clustered. The clustering tool then forms a cluster including clocked storage element 112 and clocked storage element 108, as clocked storage element 108 is un-clustered and interacts with clocked storage element 112. Next clocked storage element 106 is selected, as clocked storage element 106 has the next highest weight and remains un-clustered. Note that the cluster including clocked storage element 106 contains only clocked storage element 106, even though clocked storage element 106 interacts with clocked storage element 104, because clocked storage element 104 has previously been placed in a cluster. Thus in the present example, the clustering tool forms three clusters from clocked storage elements 102, 104, 106, 108, 110, and 112 of FIG. 1. The first cluster (cluster 402) includes clocked storage elements 102, 104, and 110, the second cluster (cluster 404) includes clocked storage element 106, and the third cluster (cluster 406) includes clocked storage elements 108 and 112.

Once all clocked storage elements have been assigned to a cluster, method 300 proceeds to step 312 and determines if any of the clusters include more than a threshold number of clocked storage elements, and if so the cluster tool divides the cluster into multiple clusters, each of the multiple clusters having a clocked storage element count less than the threshold number. Continuing the example above, if the threshold number of clocked storage elements is set to 2, then the first cluster (cluster 402) needs to be divided into two clusters because it contains 3 clocked storage elements and is therefore over the threshold number. Advancing to step 314, the clustering tool associates a common clock buffer with each of the clusters (and/or sub-clusters) to drive the clocked storage elements within the cluster.

The clustering tool may be a stand-alone tool or may be a component of an existing tool such as a design synthesis tool or a place tool. The clustering tool may also run on existing IC workstations and recognize conventional netlist file formats and provide layout information to the place tool software.

Figure 4:
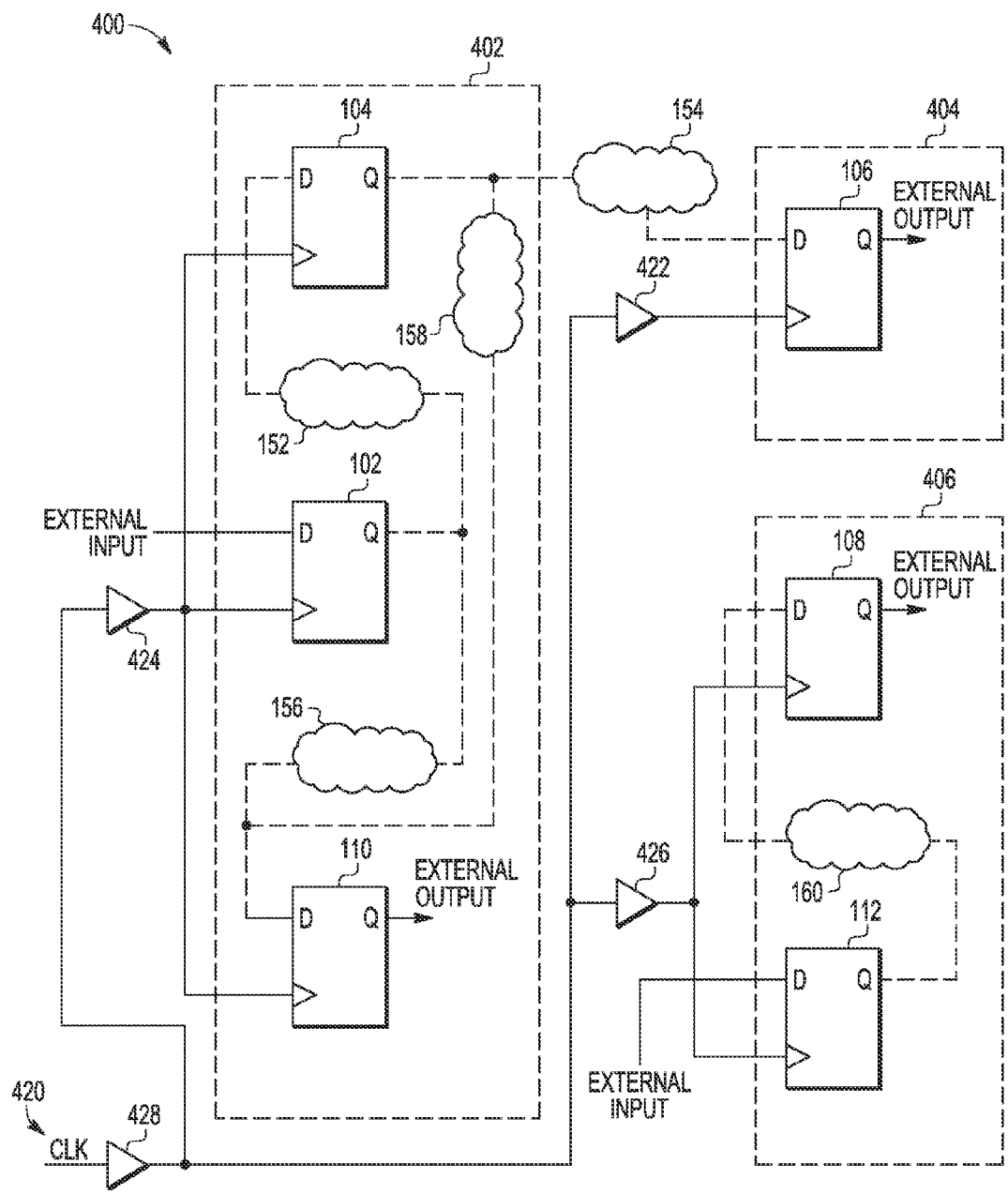
FIG. 4 illustrates in block diagram form a portion of an integrated circuit with clocked storage elements clustered according to the methods of FIGS. 2 and 3.

FIG. 4 illustrates in block diagram form a portion 400 of an IC which have been clustered according to the methods of FIGS. 2 and 3. Portion 400 includes clusters 402, 404, and 406 each containing at least one clocked storage element, clocked storage elements 102, 104, 106, 108, 110, and 112, a clock-tree 420 which includes clock buffers 422, 424, 426, and 428, and logic circuits 152, 154, 156, 158, and 160.

Each of clock buffers 422, 424, 426, and 428 has a clock input terminal and a clock output terminal for providing a clock signal. In the illustrated embodiment, clock buffer 422 has a clock input terminal connected to the clock output terminal of clock buffer 428 and a clock output terminal connected to the clock input terminal of clocked storage element 106. Clock buffer 424 has a clock input terminal connected to the clock output terminal of clock buffer 428 and a clock output terminal connected to the clock input terminal of clocked storage elements 102, 104, and 110. Clock buffer 426 has a clock input terminal connected to the clock output terminal of clock buffer 428 and a clock output terminal connected to the clock input terminal of clocked storage elements 108 and 112. Clock buffer 428 has a clock input terminal for receiving the master clock signal and a clock output terminal connected to the clock input terminal of clock buffers 422, 424, and 426.

As described above with respect to FIG. 1, clocked storage elements 102, 104, 106, 108, 110, and 112 interact with each other through logic circuits 152, 154, 156, 158, and 160. Clocked storage element 102 interacts with clocked storage element 104 through logic circuit 152 and clocked storage element 110 through logic circuit 156. Clocked storage element 104 interacts with clocked storage element 106 through logic circuit 154 and clocked storage element 110 through logic circuit 158. Clocked storage element 108 interacts with clocked storage element 112 through logic circuit 160.

Further in the illustrated embodiment, clocked storage element 102 has a clock input terminal connected to the clock output terminal of clock buffer 424, an input terminal (D), and an output terminal (Q) connected to logic circuitry 152 and logic circuitry 156. Clocked storage element 104 has a clock input terminal connected to the clock output terminal of clock buffer 424, an input terminal (D) connected to logic circuit 152, and an output terminal (Q) connected to logic circuitry 154 and logic circuitry 158. Clocked storage element 106 has a clock input terminal connected to the clock output terminal of clock buffer 422, an input terminal (D) connected to logic circuit 154, and an output terminal (Q). Clocked storage element 108 has a clock input terminal connected to the clock output terminal of clock buffer 426, an input terminal (D) connected to logic circuit 160, and an output terminal (Q). Clocked storage element 110 has a clock input terminal connected to the dock output terminal of dock buffer 424, an input terminal (D) connected to logic circuit 156 and logic circuit 158, and an output terminal (Q). Clocked storage element 112 has a clock input terminal connected to the clock output terminal of clock buffer 426, an input terminal (D), and an output terminal (Q) connected to logic circuitry 160.

Logic circuits 152, 154, 156, 158, and 160 are again illustrated as clouds and represent any number of logic gates between clocked storage elements 102, 104, 106, 108, 110, and 112 as described above. Again, logic circuit 152 has a logic depth of 3. Logic circuit 154 has a logic depth of 20. Logic circuit 156 has a logic depth of 2. Logic circuit 158 has a logic depth of 4. Logic circuit 160 has a logic depth of 3.

As described above, portion 400 includes clusters 402, 404, and 406 formed using method 300 of FIG. 3. Cluster 402 includes clocked storage elements 102, 104, and 110, cluster 404 includes clocked storage element 106, and cluster 406 includes clocked storage elements 108 and 112. Each cluster 402, 404, and 406 has a clock buffer associated therewith, to provide a common clock signal to the docked storage elements contained within the cluster. In the illustrated embodiment, cluster 402 is associated with clock buffer 424, cluster 404 is associated with clock buffer 422, and cluster 406 is associated with clock buffer 426.

As can be seen in FIGS. 3 and 4, interacting clocked storage elements are clustered based on degree of interaction which is quantified using weights formed from logic depths of interacting clocked storage elements. Further, each cluster 402, 404, and 406 receives a common clock signal from a common clock buffer. Thus, portion 400 is able to reduce the number of clock buffers while at the same time reducing clock divergence between interacting clocked storage elements and increasing overall performance.

Figure 5:
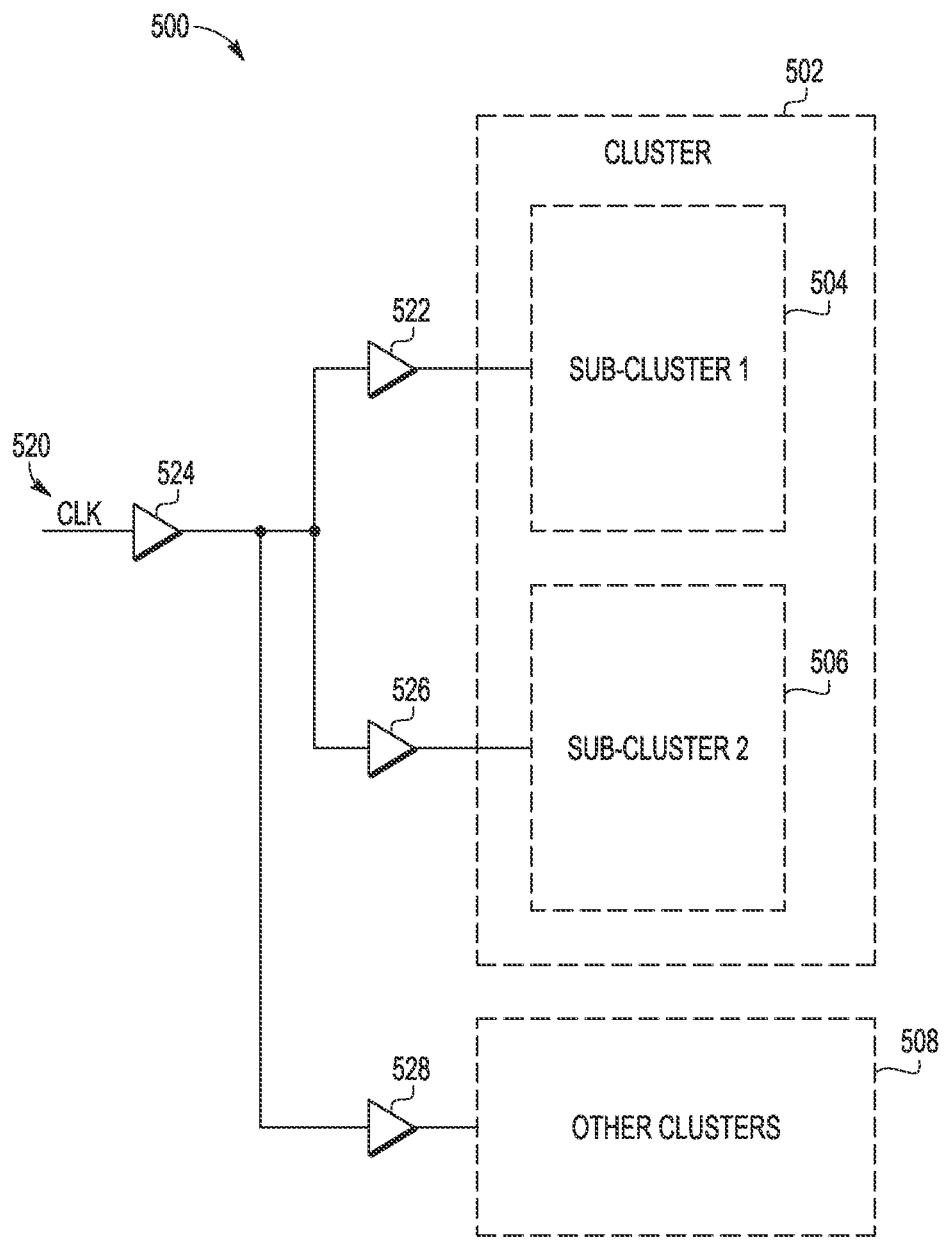
FIG. 5 illustrates in block diagram form a portion of an integrated circuit with sub-clusters of clocked storage elements according to the methods of FIGS. 2 and 3.

FIG. 5 illustrates in block diagram form a portion 500 of an IC with sub-clusters 504 and 506 of clocked storage elements clustered according to the methods of FIGS. 2 and 3. Portion 500 includes a clock-tree 520 including clock buffers 522, 526, and 528, clusters 502 and 508. Cluster 502 includes two sub-clusters 504 and 506.

Clock buffer 524 has a clock input terminal connected to clock 520 for receiving CLK and a clock output terminal. Clock buffer 522 has a clock input terminal connected to the clock output terminal of clock buffer 524, and a clocked output terminal connected to clocked storage elements of sub-cluster 504. Clock buffer 526 has a clock input terminal connected to the clock output terminal of clock buffer 524, and a clock output terminal connected to clocked storage elements of sub-cluster 506. Clock buffer 528 has a clock input terminal connected to the clock output terminal of clock buffer 524, and a clocked output terminal connected for providing a clock signal to other clock buffers (not shown) and clocked storage elements of other clusters 508.

As described with respect to FIG. 3, a single cluster, such as cluster 502, may have more clocked storage elements associated with it than a single clock buffer can drive. Therefore the clustering tool divides large clusters, such as cluster 504, with more than the threshold number of clocked storage elements into sub-clusters, such as sub-clusters 504 and 506. When the clustering tool divides a cluster each of the sub-clusters have a separate clock buffer associated with it. In the illustrated embodiment, cluster 502 is divided into sub-clusters 504 and 506. Sub-cluster 504 has clock buffer 522 associated with it, while sub-cluster 506 has clock buffer 526 associated with it.

Figure 6:
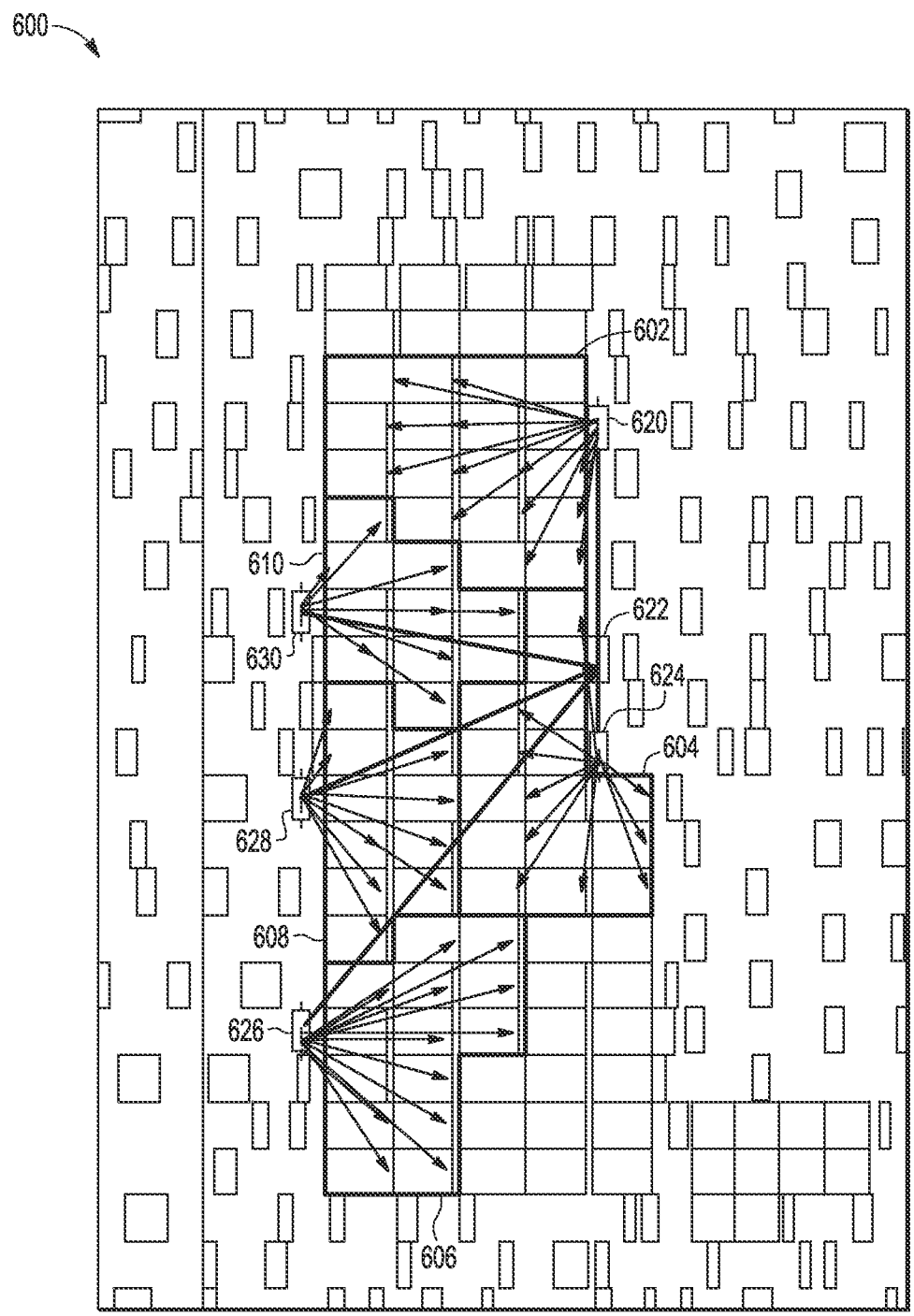
FIG. 6 illustrates a top view of a portion of an integrated circuit with clocked storage elements clustered according to the methods of FIGS. 2 and 3.

FIG. 6 illustrates a top view of a portion 600 of an IC with clocked storage elements clustered according to the methods of FIGS. 2 and 3. While this illustrated example does not correspond directly the portion 400 of FIG. 4, it shows portion 600 of an IC includes clusters 602, 604, 606, 608, and 610 with associated clock buffers 620, 622, 624, 626, 628, and 630. As can be seen from the illustrate example, clock buffer 622 provides a clock signal to clock buffers 620, 622, 626, 628, and 630, while each of the clock buffers 620, 622, 626, 628, and 630 provide the clock signal to an associated cluster. In the illustrated example, clock buffer 620 is associated with cluster 602. Clock buffer 624 is associated with cluster 604. Clock buffer 626 is associated with cluster 606. Clock buffer 628 is associated with cluster 608. Clock buffer 630 is associated with cluster 610. As can by the lines indicating interacting clocked storage elements, the place tool places the clocked storage elements associated with each cluster 602, 604, 606, 608, and 610 physically dose to each to reduce clock divergence after clock-tree synthesis.

Note that FIG. 6 illustrates that an IC designed according to the design flow described in FIGS. 2 and 3 above results in a layout in which interacting clocked storage elements are placed adjacent to each other. In this context, adjacent means in physical proximity on the IC such that there are no intervening clocked storage elements with lower degrees of interaction.

Although the present invention has been described with reference to preferred embodiments, workers skilled in the art will recognize that changes may be made in form and detail without departing from the scope of the invention.

What is claimed is:

1. An integrated circuit comprising:
a clock-tree comprising a plurality of clock buffers;
a plurality of clocked storage elements each having a clock input terminal connected to one of the plurality of clock buffers and a weight;
a plurality of logic circuits, each logic circuit associated with two of the plurality of clocked storage elements and characterized as having a logic depth, the weight of each clocked storage element being based upon each of the plurality of logic circuits associated therewith;
the plurality of clocked storage elements comprising a first clocked storage element having a highest weight of the plurality of clocked storage elements, wherein the first clocked storage element is adjacent to and interacts with a second clocked storage element of the plurality of clocked storage elements via one of the plurality of logic circuits;
wherein the weight of each clocked storage element is equal to a sum of an inverse of a logic depth of each of the plurality of logic circuits associated therewith; and
wherein a first one of the plurality of clock buffers provides a common clock signal to the first and second clocked storage elements.

2. The integrated circuit of claim 1, wherein the second clocked storage element has a highest weight of the plurality of clocked storage elements that interact with the first clocked storage element through at least one of the plurality of logic circuits.

3. The integrated circuit of claim 1, wherein the plurality of clocked storage elements comprises:
a third clocked storage element, wherein the third clocked storage element is adjacent to and connected to the first clocked storage element by a second one of the plurality of logic circuits; and
wherein the first one of the plurality of clock buffers provides the common clock signal to the third clocked storage element.

4. The integrated circuit of claim 1, wherein a second one of the plurality of clock buffers provides a separate clock signal to a third clocked storage element with a weight less than the weight of the first clocked storage element.

5. The integrated circuit of claim 4, further comprising:
a fourth clock storage element of the plurality of clocked storage elements, wherein the fourth clocked storage element is adjacent to and connected to the third clocked storage element by a second one of the plurality of logic circuits.

6. An integrated circuit comprising:
a first clocked storage element having a higher degree of interaction with a plurality of other clocked storage elements than a second clocked storage element, wherein the degree of interaction of a clocked storage element of the plurality of clocked storage elements has a weight equal to a sum of an inverse of a logic depth value associated with all other clocked storage elements of the plurality of clocked storage elements with which the clocked storage element interacts;
a first cluster comprising the first clocked storage element and a third clocked storage element of the plurality of other clocked storage elements connected to the first clocked storage element and located adjacent to the first clocked storage element on the integrated circuit, wherein the first and third clocked storage elements receive a common clock signal from a first clock buffer; and a second cluster comprising the second clocked storage element, wherein the second clocked storage element receives a clock signal from a second clock buffer.

7. The integrated circuit of claim 6, wherein each logic depth value corresponds to a number of logic levels between corresponding clocked storage elements.

8. The integrated circuit of claim 6, wherein the second cluster further comprises a fourth clocked storage element of the plurality of other clocked storage elements connected to the second clocked storage element and located adjacent to the second clocked storage element on the integrated circuit.

9. The integrated circuit of claim 6, further comprising:
a plurality of additional clusters of clocked storage elements, each cluster of the plurality of additional clusters comprising at least one of the plurality of clocked storage elements and a clock buffer common to the at least one of the plurality of clocked storage elements.

10. A method for designing an integrated circuit comprising:
mapping interactions between each of a plurality of clocked storage elements;
calculating a weight for each of the plurality of clocked storage elements, wherein the weight of a clocked storage element is equal to a sum of an inverse of a logic depth of each of the plurality of clocked storage elements with which to the clocked storage element interacts;
(a) selecting a highest weight clocked storage element from the plurality of clocked storage elements, the highest weight clocked storage element having the weight with a highest value; and
(b) generating a cluster including the highest weight clocked storage element by pulling each clocked storage element of the plurality of clocked storage elements which interacts with the highest weight clocked storage element to a location on the circuit that is unoccupied and physically close to the highest weight clocked storage element.

11. The method of claim 10, further comprising:
repeating (a) and (b), until all clocked storage elements of the plurality of clocked storage elements are clustered.

12. The method of claim 10, further comprising:
(c) associating a common clock buffer with the cluster to drive the clocked storage elements of the cluster.

13. The method of claim 12, further comprising:
repeating (a), (b), and (c), until all clocked storage elements of the plurality of clocked storage elements are in a cluster.

14. The method of claim 10, further comprising:
determining if the cluster exceeds a threshold number of clocked storage elements and if the cluster does exceed the threshold number splitting the cluster into two or more sub-clusters, each sub-cluster having a number of clocked storage elements that is less than the threshold number.

15. The method of claim 10, wherein the location is adjacent to the highest weight clocked storage element.

16. The method of claim 10, further comprising:
preforming a design synthesis, before mapping the interconnections of each of the plurality of clocked storage elements.

17. The method of claim 10, further comprising:
placing clock buffers, after generating the cluster.

18. The method of claim 10, further comprising:
preforming a clock-tree synthesis, after generating the cluster.

* * * * *

UNITED STATES PATENT AND TRADEMARK OFFICE
CERTIFICATE OF CORRECTION

PATENT NO. : 8,593,177 B2
APPLICATION NO. : 13/423333
DATED : November 26, 2013
INVENTOR(S) : Arun Sundaresan Iyer et al.

It is certified that error appears in the above-identified patent and that said Letters Patent is hereby corrected as shown below:

In the Specification

Column 1, line 14, replace "state-of the-art" with "state-of-the-art".

Column 3, line 19, replace "FIG. 11" with "FIG. 1".

Column 4, line 43, replace "docked" with "clocked".

Column 6, line 48, replace "dock output" with "clock output".

Column 6, line 48, replace "dock buffer" with "clock buffer".

Column 6, line 67, replace "docked" with "clocked".

Column 7, line 62, replace "dose" with "close".

Signed and Sealed this
Fourth Day of March, 2014

Michelle K. Lee
*Deputy Director of the United States Patent and Trademark Office*